C. B. PEOPLES & A. E. YELTON.
MILK CAN.
APPLICATION FILED FEB. 23, 1912.
1,030,325.
Patented June 25, 1912.
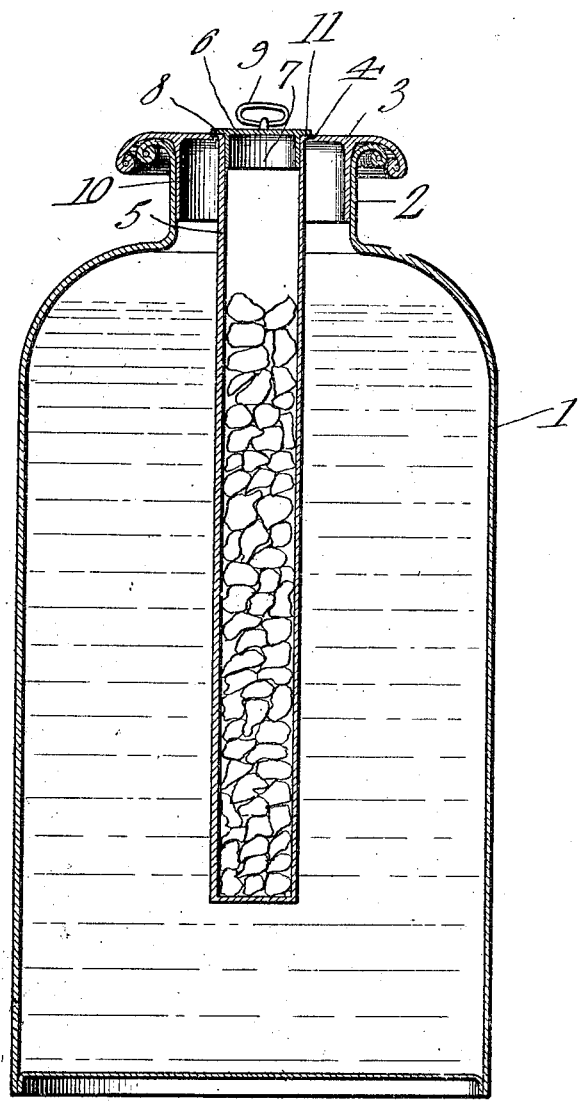
C. B. Peoples AND
A. E. Yelton,
Inventors

UNITED STATES PATENT OFFICE.

CHARLES B. PEOPLES AND ALBERT E. YELTON, OF BUTLER, KENTUCKY.

MILK-CAN 1,030,325.      Specification of Letters Patent.      Patented June 25, 1912.

Application filed February 23, 1912. Serial No. 679,433.

*To all whom it may concern:*

Be it known that we, CHARLES B. PEOPLES and ALBERT E. YELTON, citizens of the United States, residing at Butler, in the county of Pendleton, State of Kentucky, have invented a new and useful Milk-Can, of which the following is a specification.

This invention relates to milk cans, and has for its primary object to combine with the cover of a milk can, a receptacle which is adapted to enter the can and which is adapted for the reception of a cooling agent, such as ice, whereby the milk and cream may be cooled while in transit, for the purpose of preserving the milk and cream and retaining the nutritive properties and to prevent the souring of the milk or cream.

This invention also contemplates the combination of a receptacle for the reception of ice or other cooling agents with the cover of the can in a novel arrangement or relation.

This invention further contemplates for the provision of a receptacle of that character, which may be applied to the covers of milk cans in common use, without the necessity of a special cover.

With the foregoing and other objects in view, this invention is embodied in the novel construction and combination of parts elicited in the following description and hereinafter specifically claimed, reference being had to the accompanying drawings, wherein the invention is illustrated, the figure shown being a vertical central section of a milk can embodying the present invention.

Referring in detail to the illustration, the numeral 1 designates the body of an ordinary milk can, having the contracted neck 2, and the numeral 3 designates the ordinary cover for the milk can seatable on the neck and which has an annular flange 10 fitting into the neck of the can.

In providing the milk can with the present invention, a circular hole 4 is punched or stamped through the cover 3 to provide an axial opening therein. An elongated tubular receptacle 5 is then inserted through the axial opening 4 to depend axially within the can in a spaced relation to its body, bottom and neck, this tubular receptacle having its upper end outturned to provide a flange 11 seating on the cover 3. The flange 11 and the adjacent portion of the tubular receptacle 5 are secured to the cover 3 by soldering or in any other similar manner, in which event the receptacle is solely supported by the cover of the milk can. This receptacle 5 is provided with a removable closure, the closure consisting in a stopper 6 having an annular depending flange 7 insertible into the upper end of the tubular receptacle 5 and having an upper flange 8, which is seatable on the flange 11 of the receptacle 5. This stopper 6 also has a ring 9 or other finger hold attached thereto for convenience in removing the stopper and handling the same.

In use, after the milk can has been filled, ice or other cooling agent is inserted into the receptacle 5 and the stopper 6 is then inserted into the upper end of the said receptacle to close the same and thereby close the chamber thereof from the atmosphere. The cover 3 is then placed upon the can in the customary fashion, the receptacle 5 being inserted through the neck of the can, in which event, the milk can is in condition for shipment. The ice or other cooling agent within the receptacle 5 cools the milk and cream within the can while the milk can is en route to its destination, and therefore prevents the milk and cream from souring while in transit. The milk and cream in this manner are retained at a sufficiently low temperature whereby the milk and cream may be shipped to distant points without danger of a disintegration of the particles of the milk and cream, and without the loss of the nutritive properties of the milk and cream.

An important feature of the present invention, is the fact that the customary milk can in use may be readily altered to embody the same, without the necessity of a special cover or body for the milk can, and with but little trouble and at a small expense. The tubular receptacle 5 is also of a diameter considerably smaller than the diameter of the neck of the milk can or of its body, whereby the receptacle is sufficiently spaced from the body and neck of the can, and the lower end of the receptacle is also spaced above the bottom of the can. The receptacle 5 being spaced from the neck, body and bottom of the can will retain the receptacle at a sufficient distance from the can to prevent the external conditions from materially affecting the cooling effect of the agent within the receptacle. If the receptacle 5 were in contact with the neck and sides of the body of the can or the bottom thereof, the external heat would be readily conducted to the receptacle 5, it being known that sheet metal is a good conductor of heat and cans of this character usually being constructed of sheet metal, which would reduce the cooling effect of the ice or the cooling agent within the receptacle 5 transmitted to the milk and cream.

The closure as provided for the receptacle 5 is adapted to lie approximately flush with the cover 3 of the milk can, and therefore unencumbers the cover 3, but permits the stopper 6 to be readily inserted and withdrawn from the upper end of the receptacle 5. The receptacle 5 being secured to and supported solely by the closure or cover of the milk can, is removable with the said cover and the receptacle 5 need not contact with or be secured to the body, neck or bottom of the milk can in any manner.

It is understood that this invention may be applied to various forms of milk cans, and the tubular receptacle 5 may be constructed of various diameters and lengths to prevent the level of the milk and cream within the can from rising so as to overflow the can when the cover is placed upon the milk can.

What is claimed is:

In combination with a milk can embodying a contracted neck and its cover seatable on the neck and having a flange adapted to fit in the neck and provided with an axial opening, of a tubular receptacle passing through the said opening, depending axially within the can in a spaced relation to its body, bottom and neck, having its upper end out-turned to provide a flange seating on and soldered to the cover for solely supporting the receptacle by the cover, and adapted for the reception of a cooling agent, and a stopper insertible in the upper end of the receptacle and having an upper flange seatable on the former flange so that the stopper lies approximately flush with the cover.

In testimony that we claim the foregoing as our own, we have hereto affixed our signatures in the presence of two witnesses.

CHARLES B. PEOPLES.
ALBERT E. YELTON.

Witnesses:
G. B. McLAUGHLIN,
B. K. WIGGINGTON.